United States Patent Office 3,311,674
Patented Mar. 28, 1967

3,311,674
PROCESS FOR PREPARING HEAT-CURABLE COMPOSITIONS COMPRISING REACTING POLYETHERACETAL PREPOLYMER CONTAINING HYDROXY GROUPS WITH A HYDROXY REACTIVE CURING COMPONENT
Norman C. MacArthur, Avondale, Pa., assignor to Hercules Incorporated, a corporation of Delaware
No Drawing. Filed Apr. 3, 1964, Ser. No. 357,282
8 Claims. (Cl. 260—849)

This invention relates to the preparation of heat-curable compositions that are useful in the coating and plastics arts. More particularly, this invention relates to the preparation of heat-curable compositions comprising polyetheracetals derived from spirobi(meta-dioxane) derivatives and polyols, and modified with curing components as hereinafter set forth to make them more useful in the coating and plastics arts.

It is known that diallylidene pentaerythritol, also known as 3,9-divinylspirobi(meta-dioxane), and having the formula

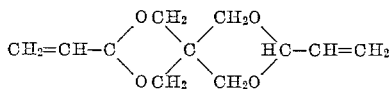

can be prepared by reacting pentaerythritol and acrolein, and that it can be condensed by heating in the presence of strong acid catalysts with various polyols to form substantially infusible solids. Other related spirobi(meta-dioxane) compounds react similarly.

Although such cross-linked resins, containing as they do, both ether linkages and acetal linkages, have many properties which make them commercially attractive in the plastics and coatings arts, they possess the disadvantage of releasing acrolein or similar lachrymator when heated to effect cure, and even though the amount of such lachrymator is quite small, it is sufficient to annoy and irritate persons who use the compositions. Moreover, all such resins heretofore have required strong acid catalysts at relatively high temperatures for satisfactory curing into insoluble infusible films, and the combination of the strong acid catalyst and high temperature of cure is detrimental and damaging to many substrates, such for example, as corrodible metal surfaces such as steel, or cellulosic textile fibers sensitive to acid hydrolysis. Furthermore, experience has demonstrated that when such polyetheracetal resins are blended into coating compositions with various other synthetic resin types, such as many of the A-stage phenol-formaldehyde, urea-formaldehyde, and melamine-formaldehyde resins, and the like, and cured to achieve certain improvements in properties such as increased hardness, improved adhesion, improved flame-resistance, or the like, that incompatibility is often encountered. Such incompatibility is manifested by haziness, nonuniformity, and irregular properties in the resulting cured film due to the two-phase nature of the incompatible film.

Now, in accordance with this invention, it has been discovered how to prepare heat-curable compositions of polyetheracetal resins derived from spirobi(meta-dioxane) derivatives and polyols, and modified with a hydroxyl reactive curing component which substantially overcome the above-enumerated disadvantages of the prior art polyetheracetaal resins. This is accomplished by initially reacting substantially stoichiometric equivalents of a diallylidene acetal and polyol having a degree of functionality with respect to hydroxyl groups greater than 2 in the presence of an acid catalyst to prepare a solvent-soluble polyetheracetal prepolymer having at least one free hydroxyl group per molecule, and removing the catalyst therefrom. The resulting catalyst-free polyetheracetal prepolymer and a hydroxyl reactive curing component therefor having a degree of functionality sufficient to produce a cross-linked structure with said prepolymer when cured therewith are then partially reacted together in a mutual solvent until a film of the partially reacted prepolymer and hydroxyl reactive curing component, upon evaporation of said solvent, remains clear. The resulting composition, upon addition of a mild carboxylic acid catalyst, and coated on a substrate, is readily cured by heat to produce a homogeneous compatible cross-linked film with substantially no evolution of acrolein or similar lachrymator. The resulting cross-linked films are substantially insoluble and infusible and are tough and flexible. Moreover, there is substantially no tendency for the coating compositions to corrode or otherwise damage the substrate during the curing operation.

The diallylidene acetals suitable for practice of this invention are well known materials which can be represented by the following formula:

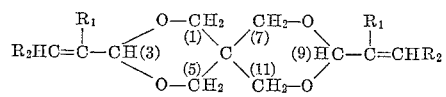

in which $R_1$ represents hydrogen, alkyl having from 1 to 6 carbon atoms, phenyl, or halogen, and $R_2$ represents hydrogen or methyl. They are readily prepared by known methods by the simple expedient of heating two mols of an unsaturated aldehyde of not more than 10 carbon atoms of the general formula:

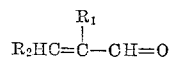

in which $R_1$ and $R_2$ have the same meaning as set forth above, with one mol of a polyhydroxy alcohol capable of forming at least two cyclic acetal groups per mol of polyhydroxy alcohol, in the presence of an acid catalyst such as p-toluenesulfonic acid. However, it is customary in preparing the diallylidene acetals of this invention to employ an excess over the stoichiometric requirement of the unsaturated aldehyde, and to strip off excess aldehyde at the end of the condensation reaction.

Some typical unsaturated aldehydes of the above formula include, by way of example, acrolein, methacrolein, α-hexylacrolein, α-isobutylacrolein, α-chloroacrolein, α-bromoacrolein, α-phenylacrolein, crotonaldehyde, α-chlorocrotonaldehyde, β-bromocrotonaldehyde, α-butylcrotonaldehyde, α-methylcrotonaldehyde, α-phenylcrotonaldehyde, and the like.

Typical polyhdroxy alcohols capable of forming at least two cyclic acetals per mol thereof include, for example, pentaerythritol, dipentaerythritol, tripentaerythritol, sorbitol, and the like.

Thus, for example, the reaction of pentaerythritol with acrolein produces 3,9-divinylspirobi(meta-dioxane); the reaction of pentaerythritol with α-chloroacrolein produces 3,9-di(1-chlorovinyl) spirobi(meta-dioxane); the reaction of pentaerythritol with methacrolein produces 3,9-diisopropenylspirobi(meta-dioxane); the reaction of pentaerythritol with crotonaldehyde produces 3,9-dipropenylspirobi(meta-dioxane), etc.

The polyetheracetals of this invention are obtained by reacting substantially stoichiometric equivalents of a diallylidene acetal as described above with polyhydroxy alcohol having a degree of functionality with respect to hydroxyl groups greater than 2 at elevated temperatures in the presence of an acid catalyst. Suitable polyhydroxy alcohols that can be used, singly or in admixture, for reaction with diallylidene acetals to prepare the solvent-soluble polyetheracetal prepolymers of this invention having at least one free hydroxyl group per molecule, include trimethylolethane, trimethylolpropane, glycerol, pentaerythritol, dipentaerythritol, sorbitol, and others in which three or more hydroxyl groups are attached to a hydrocarbon nucleus. This invention also contemplates mixtures of any of the common and well-known dihydroxy alcohols with any of the polyhydroxy alcohols having three or more hydroxyl groups per molecule, and suitable dihydroxy alcohols for this purpose include, singly or in admixture, ethylene glycol, propylene glycol, diethylene glycol, triethylene glycol, dipropylene glycol, butanediols, pentanediols, octanediols, decanediols, and any others having two hydroxyl groups per molecule. It is apparent, of course, that dihydroxy alcohols alone cannot produce a polyetheracetal prepolymer having free hydroxyl groups unless steps are taken to assure that all chains are started and terminated with hydroxyl groups.

The selection of polyhydroxy alcohol systems for reaction with the diallylidene acetal is quite flexible, but must meet the requirement that the resulting polyetheracetal prepolymer have sufficient free hydroxyls for the ultimate curing reaction. In general, the hydroxyl functionality of the polyetheracetal prepolymer will be between 1 and 4; and the exact hydroxyl functionality required of the polyetheracetal prepolymer will be determined by the functionality of the selected hydroxyl reactive curing component. With curing components having a high degree of functionality, such for example as highly reactive melamine-formaldehyde resins, the hydroxyl functionality of the polyetheracetal prepolymer can approach 1. However, a hydroxyl functionality greater than 2 is preferred for the polyetheracetal prepolymer, since this favors faster curing time and much more flexibility of choice in selection of hydroxyl reactive curing component. Aside from the above functionality requirement, the selection of the specific polyhydroxy alcohol system employed will reflect the usual considerations of toughness, flexibility, solubility, etc., common to alkyd resin technology. Hence, from a consideration of the desired hydroxyl functionality and other properties desired in the polyetheracetal prepolymer, it is a simple matter to select a polyhydroxy alcohol system which will accomplish the desired objectives, and produce a polyetheracetal prepolymer having the desired properties with the ultimate curing reaction in mind.

Any strong nonoxidizing acid will serve as catalyst for preparation of the polyetheracetal prepolymers of this invention, e.g., sulfuric acid, hydrochloric acid, phenyl acid phosphate, alkane sulfonic acids, such as methyl sulfonic acid, ethylsulfonic acid, etc., aryl sulfonic acids such as p-toluene sulfonic acid, naphthalene sulfonic acid, etc., dialkyl sulfates such as diethyl sulfate, diisopropyl sulfate, etc., and sulfonated ion exchange resins such as sulfonated cross-linked polystyrene resins, etc. In general, the reaction rate is proportional to the catalyst concentration, and catalyst concentrations between about 0.05% and 5% by weight may be employed. However, while faster reaction rates are tempting, it should be kept in mind that the preparation has the potential to gel, and moderate reaction rates make it easier to control the preparation. Hence, catalyst concentrations between about 0.1% and about 0.5% by weight are particularly useful for controlling the reaction.

The reaction between the diallylidene acetal and polyhydroxy alcohol having hydroxyl functionality greater than 2 is carried out at elevated temperatures between about 100° C. and about 175° C., keeping in mind that, in general, the stronger the acid catalyst employed the lower is the preparation temperature. Thus, employing a few tenths weight percent of diethyl sulfate as catalyst, reaction temperatures on the order of 100° C.–110° C. are satisfactory, whereas with a similar amount of a sulfonated cross-linked polystyrene resin catalyst, reaction temperatures on the order of 140° C.–150° C. are necessary for a similar rate of reaction.

The polyetheracetal prepolymer preparation is stopped at any desired point short of the gel point of the reaction mixture, which point is selected with reference to the ultimate curing reaction desired, by neutralization of the catalyst or by removal of the same. Sulfonated ion exchange resin catalysts such as sulfonated cross-linked polystyrene resins are readily removed by filtration. Soluble catalysts such as sulfuric acid, diethyl sulfate, phenyl acid phosphate, etc., are neutralized by adding an excess of sodium bicarbonate, cutting with solvent, and filtering. The free hydroxyl content of the catalyst-free polyetheracetal prepolymer is then determined by known and conventional analytical procedures.

As pointed out hereinbefore, the catalyst-free polyetheracetal prepolymer is then partially reacted with a hydroxyl reactive curing component in a mutual solvent to effect compatibility of the two reactants, and this is the essential feature of the invention leading to improved properties in the final cured coating or plastic.

An outstanding advantage of this invention, therefore, resides in the very wide selection of curing components which is made possible by overcoming compatibility problems by prereacting the polyetheracetal prepolymer and curing component to the point where manifestations of poor compatibility are eliminated. Hence, the selection of hydroxyl reactive curing component is quite flexible, and is usually chosen with consideration of the curing cycle desired, as well as by the properties desired in the final cured coating or plastic.

Suitable hydroxyl reactive curing components for the purposes of this invention may be any of the well-known hydroxyl reactive resins, or combinations thereof, such as the polyisocyanates such as tolylene diisocyanate, diphenylmethane 4,4$^1$-disocyanate, etc.; polycarboxylic acids such as maleic acid, sebacic acid, phthalic acid, citric acid, etc.; high acid number alkyd resins such as those from glyceryl phthalate, glyceryl sebacate, pentaerythritol fumarate, and the like; polyepoxy resins such as those prepared from bisphenol and epichlorohydrin, etc.; solvent-soluble phenol-formaldehyde, urea-formaldehyde, melamine-formaldehyde, and alkylated melamine-formaldehyde resins; and the like. The functionality of this component with respect to hydroxyl reactivity must be adequate to cure the polyetheracetal prepolymer. The lower limit of such functionality is 2, and there is no maximum value for functionality except that it should not impair the solubility or viscosity of the final system. In all cases, the amount of curing component used will depend not only on the actual functionalities of the polyetheracetal prepolymer and the selected curing component, but also on the desired properties of the final cured system, such as flexibility, toughness, hardness, etc. In general, however, the ratio of polyetheracetal prepolymer to hydroxyl reactive curing component will be within the range from about 20:80 to about 80:20 by weight.

It should be noted that the prereaction of polyetheracetal prepolymer and hydroxyl reactive curing component to effect compatibility is carried out in a mutual solvent for the two materials, and for this purpose any volatile organic solvent, or mixture of solvents, which is a solvent for both reactants, and which is inert, i.e., which does not enter into reaction with either of said reactants, is suitable. The mutual solvent for the prereaction of the polyetheracetal prepolymer and hydroxyl reactive curing component, therefore, may be selected as desired from among any of the well-known volatile esters, ethers, ketones, aliphatic and aromatic hydrocarbons, chlorinated aliphatic and aromatic hydrocarbons, and mixtures of any of these, which are solvents for both reactants.

The prereaction to effect compatibility of the polyetheracetal with the hydroxyl reactive curing component is carried out in the absence of catalyst. In this way the prereaction can be controlled at a sufficiently slow rate to avoid gelation, and any convenient temperature which will sustain a uniform controlled rate of reaction may be chosen for the prereaction. The prereaction is carried out at least to the point where all manifestations of poor compatibility are eliminated, and in all instances is terminated short of the gel point. The course of the prereaction can be readily followed by forming films of samples of the reaction mixture at intervals, evaporating solvent therefrom, and observing the deposited film for clarity and homogeneity. A film which remains clear and homogeneous upon removal of solvent is an excellent indication that incompatibility between the polyetheracetal prepolymer and hydroxyl reactive curing component has been substantially eliminated.

Final curing of the prereacted composition is carried out under temperature conditions known to be characteristic of the curing resin used. With a butylated melamine-formaldehyde resin this is achieved by introducing from about 0.01% to about 2% by weight, preferably from about 0.1% to about 1% by weight, of a mild carboxylic acid catalyst into the partially reacted mixture, evaporation of solvent therefrom, and heating at a temperature within the range from about 120° C. to about 150° C. to produce a homogeneous compatible cross-linked structure which is substantially insoluble and infusible. Suitable catalysts for the final curing reaction include substantially any of the aliphatic and aromatic carboxylic acids, and anhydrides thereof. Such catalysts are relatively mild in comparison to the strong inorganic acids, sulfonic acids, sulfuric and phosphoric acid esters, etc., and do not tend to corrode or degrade substrates under the conditions of the final curing of the compositions. Some typical carboxylic acid catalysts include, for example, acetic acid, acetic anhydride, bromoacetic acid, chloroacetic acid, $\alpha$-chloropropionic acid, $\beta$-chloropropionic acid, citric acid, formic acid, benzoic acid, fumaric acid, hippuric acid, isobutyric acid, isovaleric acid, lactic acid, maleic anhydride, malic acid, malonic acid, $\alpha$-naphthoic acid, phthalic acid, phthalic anhydride, propionic acid, butyric acid, pyromucic acid, salicylic acid, succinic acid, succinic anhydride, tartaric acid, valeric acid, etc.

The invention is illustrated by the following examples in which parts and percentages are by weight unless otherwise specified.

*Example 1*

A closed reaction vessel having a valve controlled drain at its bottom and fitted with external heating mantle, a stirring motor, a thermometer, a nitrogen entry port, and a condenser which led in turn to a vessel filled with refined mineral oil through which the system was vented was charged with:

| | Parts |
|---|---|
| Diallylidene pentaerythritol | 1,696 |
| Pentaerythritol | 326 |
| Diethylene glycol | 339 |
| Propylene glycol | 182 |
| Cross-linked sulfonated polystyrene ion-exchange resin (acid form, dry) | 51 |

The preparation was carried out in a nitrogen atmosphere. The temperature of the charge was taken to 150° C. in about 2 hours, at which point the reaction became noticeably exothermic and it was necessary to drop the heating mantle for about 5 minutes in order to level out the reaction temperature. The reaction mixture was then maintained at a temperature between about 148° C. and 152° C. for the next 1½ hours. By this time, the Gardner viscosity of a 75% by weight solution of a sample of the polyetheracetal resin in 80:20 xylene:acetone by weight had reached the value of K. Heat was turned off, and the reaction mixture was immediately drained from the reaction vessel onto a coarse-fritted vacuum filter, and the molten resin was separated from the ion-exchange resin catalyst under about 20 inches of vacuum. Approximately 2,298 parts of pale yellow resin, free of catalyst, was recovered. This resin had a free hydroxyl content of 7.1%±0.1%, as determined by the acetylation method, and a molecular weight by the Rast Method of 610±2, and absorbed 0.32%± 0.02% hydrogen. The Gardner viscosity of this resin remained unchanged over a period of 6 months of storage. The resin was dissolved in xylene to prepare a solution containing 75% solids.

*Example 2*

A coating composition was prepared from the polyetheracetal resin described in Example 1 by charging the reaction vessel employed in Example 1 with 400 parts of the 75% solids xylene solution of said resin and 120 parts of a 60% solution of a butylated melamine-formaldehyde resin (Resimene 881) in 1:1 butanol:xylene by weight. Initially a film prepared from the above mixture of polyetheracetal resin and butylated melamine-formaldehyde resin upon evaporation of solvent was hazy, indicating incompatibility of the two resin components. The above resin solution mixture in mutual solvent was heated with stirring for 4 hours at 110° C. A film cast from this reaction mixture, upon evaporation of solvent, remained clear, indicating that incompatibility of the two resin components had been overcome by partial reaction. The above prereacted resin solution had a Gardner viscosity of V. It was mixed with 0.2% by weight, based on total solids, of maleic anhydride and applied by knife coating on Bonderite 100 steel panels. After a 5–10 minute flash-off period, the wet coatings were baked for 30 minutes at 300° F. The resulting baked coatings were clear and homogeneous, and were insoluble and infusible. They were 0.7–0.8 mil thick, had a 60° gloss rating of 100+, and a Sward hardness value of 56%. There was no indication of corrosion of the steel substrate under the coatings.

The preceding examples are merely illustrative of the invention and its advantages. There are, obviously, many other variations in the invention, particularly with respect to the polyetheracetal prepolymer and the hydroxyl reactive curing component therefor, that will be apparent to those skilled in the art from the foregoing description. It will also be apparent to those skilled in the art that prereaction of polyetheracetal resins with hydroxyl reactive curing components in accordance with this invention make possible the design of cured systems having a broad range of properties. Such systems, either with or without inert fillers, pigments, plasticizers, flame retardants, and similar conventional modifiers, are useful as coatings for the protection of glass, plastic, metal, wood, and textile substrates. They are also useful for potting and encapsulating purposes, and as adhesives and inks.

What I claim and desire to protect by Letters Patent is:

1. A process for preparing heat-curable compositions which comprises partially reacting together components consisting essentially of (1) from about 20% to about 80% by weight of a soluble polyetheracetal prepolymer resin having from 1 to 4 free hydroxyl groups per molecule, and derived from the reaction of a cyclic diallylidene acetal having the general formula

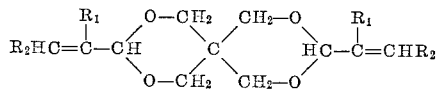

wherein $R_1$ is selected from the group consisting of hydrogen, alkyl containing from 1 to 6 carbon atoms, phenyl, and halogen radicals and $R_2$ is selected from the group consisting of hydrogen and methyl radicals, and polyhydroxy alcohol having a degree of functionality with respect to hydroxyl groups greater than 2, and (2) from about 80% to about 20% by weight of a hydroxyl reactive curing component therefor having a degree of functionality with respect to hydroxyl groups of at least 2, and sufficient to form a substantially insoluble, cross-linked structure with said polyetheracetal prepolymer resin when cured therewith, in a mutual solvent and in the absence of polymerizing catalyst, until a film of the above said components, upon evaporation of said solvent, remains clear, and thereafter incorporating a carboxylic acid curing catalyst into the partially reacted mixture of said components.

2. The process in accordance with claim 1 in which the cyclic diallylidene acetal is 3,9-divinylspirobi(meta-dioxane).

3. The process in accordance with claim 1 in which the cyclic diallylidene acetal is 3,9-di(1-chlorovinyl)-spirobi(meta-dioxane).

4. The process in accordance with claim 1 in which the cyclic diallylidene acetal is 3,9-diisopropenylspirobi-(meta-dioxane).

5. The process in accordance with claim 1 in which the cyclic diallylidene acetal is 3,9-dipropenylspirobi-(meta-dioxane).

6. The process in accordance with claim 1 in which the polyetheracetal prepolymer resin is derived from 3,9-divinylspirobi(meta-dioxane) and polyhydroxy alcohol having a degree of functionality with respect to hydroxyl groups greater than 2 and consisting of a mixture of pentaerythritol and dihydroxy alcohol.

7. The process in accordance with claim 1 in which the hydroxyl reactive curing component is a butylated melamine-formaldehyde resin.

8. The process in accordance with claim 1 in which the polyetheracetal prepolymer resin is derived from 3,9-divinylspirobi(meta-dioxane) and polyhydroxy alcohol having a degree of functionality with respect to hydroxyl groups greater than 2 and consisting of a mixture of pentaerythritol and dihydroxy alcohol, and in which the hydroxyl reactive curing component is a butylated melamine-formaldehyde resin.

References Cited by the Examiner

UNITED STATES PATENTS

| 2,687,407 | 8/1954 | Orth | 260—88.3 |
| 2,915,492 | 12/1959 | Wilson et al. | 260—67 |

MURRAY TILLMAN, *Primary Examiner.*

J. C. BLEUTGE, *Assistant Examiner.*